Jan. 8, 1952 P. H. KARLSSON 2,582,133
GAS CLEANING
Filed May 10, 1947 11 Sheets-Sheet 1

Jan. 8, 1952 P. H. KARLSSON 2,582,133
GAS CLEANING
Filed May 10, 1947 11 Sheets-Sheet 2

INVENTOR
Per Helmer Karlsson
BY
his ATTORNEY

Jan. 8, 1952     P. H. KARLSSON     2,582,133
GAS CLEANING Filed May 10, 1947     11 Sheets-Sheet 6

INVENTOR
Per Helmer Karlsson
BY
ATTORNEY

Jan. 8, 1952     P. H. KARLSSON     2,582,133
GAS CLEANING

Filed May 10, 1947     11 Sheets-Sheet 8

Jan. 8, 1952     P. H. KARLSSON     2,582,133
GAS CLEANING

Filed May 10, 1947     11 Sheets-Sheet 9

Jan. 8, 1952 P. H. KARLSSON 2,582,133
GAS CLEANING
Filed May 10, 1947 11 Sheets-Sheet 10

Fig. 20.

INVENTOR
BY
ATTORNEY

Jan. 8, 1952 P. H. KARLSSON 2,582,133
GAS CLEANING
Filed May 10, 1947 11 Sheets-Sheet 11

INVENTOR
BY
ATTORNEY

Patented Jan. 8, 1952

2,582,133

UNITED STATES PATENT OFFICE 2,582,133

GAS CLEANING

Per Hilmer Karlsson, Wellsville, N. Y., assignor to The Air Preheater Corporation, New York, N. Y.

Application May 10, 1947, Serial No. 747,167

16 Claims. (Cl. 183—7)

The present invention relates to gas cleaning and has particular reference to the removal from combustion or other impure gases of the fine solid particles or impurities ranging in size from a maximum of a few microns in diameter, for example of the order of fifteen microns, down to sub-microscopic size.

It is the general object of the invention to provide novel means for removing such impurities from gases so as to provide for the discharge to atmosphere of relatively clear stack gases substantially free from the fine smoke producing particles within the size range above mentioned, which particles for convenience will hereinafter be referred to as "fines." A further object of the invention is the provision of apparatus operative to substantially remove the fines without interruption from a continuously flowing column of impure gases, and a still further object is the provision of such apparatus which may effectively be employed for removal of fines from relatively high temperature gases so that this constituent of the impurities carried by the gases may be removed from gases prior to their passage through heat exchange apparatus for recovering useful heat therefrom at temperatures lower than those at which the fines are removed. It has comparatively recently been discovered that the fines, with the removal of which the present invention is primarily concerned, are productive of serious corrosive effect if permitted to accumulate in deposit form on the metal parts of gas ducts and heat exchange surface, even at relatively high temperature zones well above the dew point of the gases, and in one of its aspects the invention has the further object of providing apparatus in which effective cleaning of fines from the gases is accomplished in a unitary structure operative both to clean the gases and to usefully recover heat from the cleaned gases. Other and more detailed objects of the invention and the advantages to be derived from its use will appear hereinafter as this specification proceeds.

In order to achieve the several objects of the invention, it contemplates removal of the fines by electrostatic means incorporated in apparatus providing initially an ionizing section or zone, a collecting section or zone in which the particles previously electrostatically charged in the ionizing zone are deposited and collected on a suitable collecting surface, and a cleaning zone located outside of the path of flow of the gas column in which the deposits are removed from the collecting surface. Further, the invention contemplates the provision of ionizing and collecting sections in which the gas column to be cleaned is sub-divided and caused to flow through a multiplicity of gas channels arranged in parallel, with each of the individual gas channels separately energized and with the channels, particularly in the collecting section, having a length many times greater than their cross sectional area so that the maximum transverse path of travel of any charged particle to a collecting surface in the collecting section is relatively very slight as compared to the length of travel of the particle through the collecting section. Still further the invention contemplates provision of collecting sections, the total cross sectional area of which for flow of gases is greater than that required for flow of the gas column to be treated without undue resistance or pressure drop through the apparatus, with less than the total number of gas channels provided being utilized at a given time and with the remainder of the channels disposed outside the path of flow of the gas column so that the collecting surfaces may be cleaned without interrupting the gas cleaning function of the apparatus as a whole. Still further the invention contemplates the provision of apparatus of the kind described in which means are provided for changing the relation of flow of the gas column to the channels provided by the collecting section so that individual channels may be continuously or intermittently transferred from location in the collecting zone to location in the cleaning zone and vice versa, and still further the invention contemplates the provision of apparatus in which the transfer to the collecting surface from the collecting zone to the cleaning zone and back to the collecting zone is accomplished by rotor mechanism carrying the structure providing the collecting surfaces and operative when turned to move the gas channels and the walls thereof forming the collecting surfaces transversely across the gas column, with the collecting walls and the channels formed thereby disposed substantially longitudinally of the general direction of flow of the gases.

For a better understanding of the more detailed nature of the invention and the manner in which its several objects are attained reference may best be had to the ensuing portion of this specification taken in conjunction with the accompanying drawings in which by way of example but without limitation several suitable embodiments of apparatus for carrying the invention into effect are disclosed in the drawings, in which:

Referring now more particularly to the embodiment shown in Figs. 1 to 7, 10 indicates a gas supply duct delivering gases containing fines from a furnace or other apparatus and 12 is a discharge duct for carrying the cleaned gases from the apparatus. Between ducts 10 and 12 a stationary housing or mounting structure indicated generally at 14 is located. In the lower portion of this structure, in communication with the inlet duct 10, is located the ionizing section 16 of the cleaning apparatus, later to be described in detail.

In the embodiment shown, the stationary structure provides a cylindrical outer shell 18 fixed between upper and lower end plate structures 20 and 22 respectively. It also provides upper and lower bearings 24 and 26 respectively for rotatably supporting the central shaft or core portion of a rotor indicated generally at 28, which may be turned relative to the stationary structure 14 by means of a gear drive 30. The rotor comprises an inner cylindrical shell 32 and an outer shell 34, joined by a plurality of radially extending partitions 36 to divide the annular space between the shells into a series of sector-like compartments 38 providing the space for the collecting section of the cleaner, indicated generally at 40. As seen more clearly from Figs. 4 and 5, the collecting surface is provided by a plate structure 42 forming in each compartment a bank comprising a multiplicity of open ended gas channels 44 of hexagonal cross section, this plate structure being welded or otherwise secured to the shell and partition structure of the rotor. At the upper and lower ends of the plate structure, the marginal spaces between the bank of channels 44 and the shells and partitions of the rotor are closed by suitable plates 46, the purpose of these plates being to force all of the gas passing through the rotor to flow through the collecting channels 44.

Figure 4:
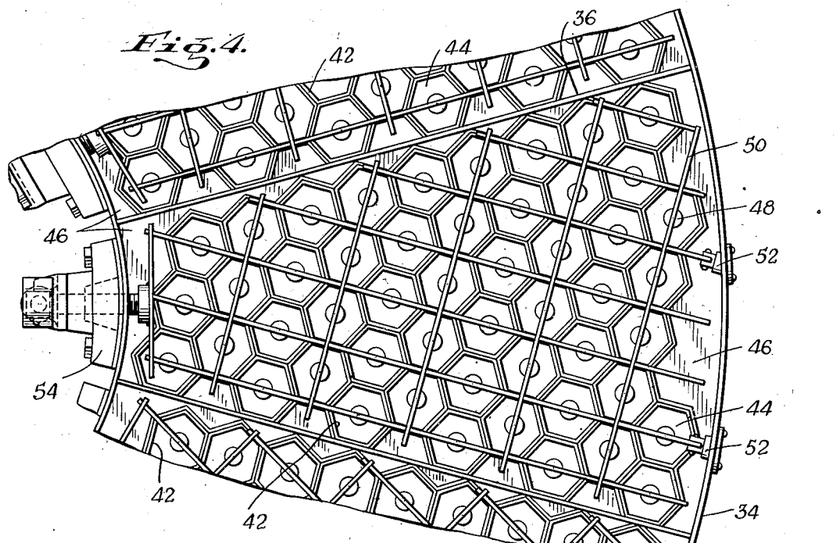
Fig. 4 is a fragmentary transverse view on larger scale showing certain details of the rotor structure of Fig. 1.
Figure 5:
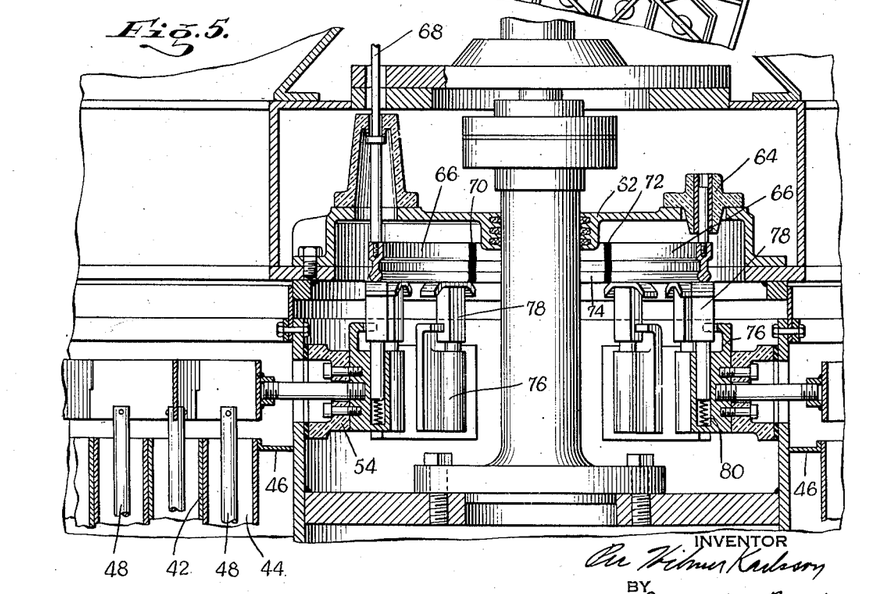
Fig. 5 is a fragmentary longitudinal view partly in section showing a portion of the apparatus illustrated in Fig. 1.

Each of the gas channels 44 is traversed longitudinally by a centrally located electrode 48 which in the embodiment illustrated is in the form of a solid rod but which also may be in the form of a hollow tube. The electrodes 48 are supported by grids 50 of metal plate, there being one such grid for each compartment of the rotor and the grids being electrically insulated from the framework of the rotor. As seen in Fig. 4 the grid 50 is supported by insulating connections 52 carried by the outer rotor shell 34 and insulating support 54 carried by the inner shell of the rotor.

At the lower or inlet ends of the gas channels grids 56 similar to grids 50 are provided, these also being supported by insulators 58 carried by the outer rotor shell and insulators 60 carried by the inner shell. At their upper ends the electrodes are riveted or otherwise secured to the upper grid while at their lower ends the electrodes are preferably slotted to provide a sliding connection with the lower grid to compensate for any unequal expansion between the parts.

The stationary structure provides a carrier plate 62 above the rotor which supports by means of a plurality of insulating supports 64 a distributing ring 66 to which current is supplied through the feeder 68. The ring 66 is electrically broken by insulating sections 70 and 72 to provide a sector 74 which is not energized, the purpose of this sector being explained later.

Each of the insulating connections 54 carried by the inner rotor shell in turn carries a supporting block 76 in which is slidably mounted for vertical movement a shoe 78 engaging the distributing ring 66 under the influence of a spring 80. From the above it will be apparent that through the structure just described the electrodes 48 may be electrically charged and that as the rotor is turned the several grids with their associated electrodes will be electrically de-energized as the shoes which supply the several grids traverse the uncharged or dead sector 74 of the collecting ring.

The upper and lower end plates 20 and 22 of the stationary mounting structure are formed to provide arcuate openings 82 and 84 respectively which are in axial alignment and which are coextensive with the discharge end of duct 10 and the inlet end of duct 12. These plates further provide arcuate openings 86 and 88 of considerably lesser peripheral extent. The opening 82 is separated from opening 86 in the top plate 20 by radially extending web portions 90 of the plate 20, as will be seen from Fig. 2, and the plate 22 is provided with similar web portions 92 for separating the openings 84 and 88 in that plate.

To prevent leakage radially of gas from the rotor structure, a peripherally extending flexible sealing member 94 is carried by the upper end of the outer rotor shell 34 and slidably bears against the stationary structure. Similarly a seal strip 96 carried by the inner shell bears against the stationary structure to prevent leakage radially inwardly. Similar outer and inner sealing strips 98 and 100 are carried at the lower end of the rotor. The radially extending partitions 36 in the rotor extend longitudinally into proximity to the end plates 20 and 22 and carry at their upper and lower ends flexible sealing strips adapted to engage or closely pass the webs 90 and 92 in the respective end plates as the rotor is turned, one of said strips 36a appearing in Fig. 7.

The stationary structure is formed to provide a chamber 102 over the opening 86 in the top end plate 20, and below the opening 88 in the bottom end plate 22 this structure is formed to provide a hopper 104 leading to a discharge pipe 106.

A cleaning pipe 108 connected to a source of high pressure fluid such as steam or compressed air is slidably mounted to move radially within the chamber 102, this pipe having a downwardly directed nozzle 110 for directing cleaning fluid through that portion of the rotor structure located between the openings 86 and 88 in the end plates.

Figures 1, 1A:
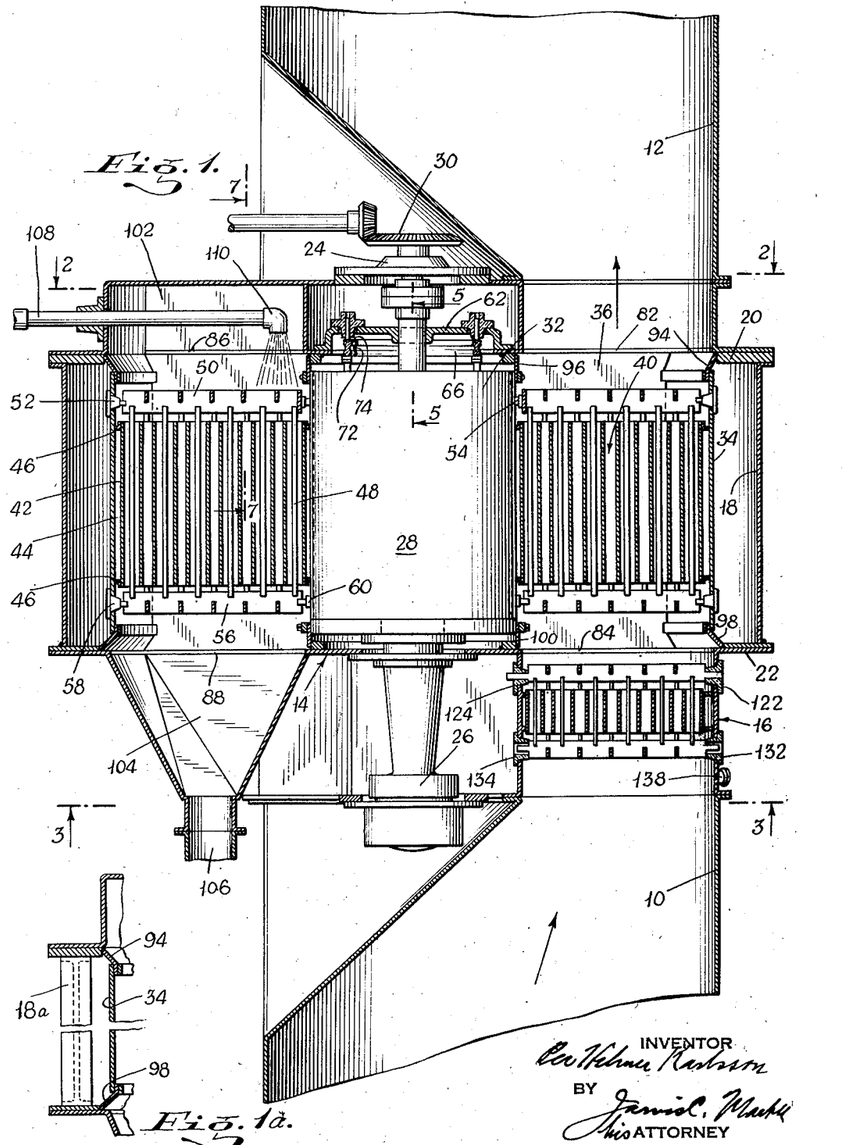
Fig. 1 is a more or less schematic central longitudinal section through a gas cleaning apparatus embodying the invention.
Fig. 1a is a fragmentary section showing a modification of part of the structure shown in Fig. 1.
Figure 2:
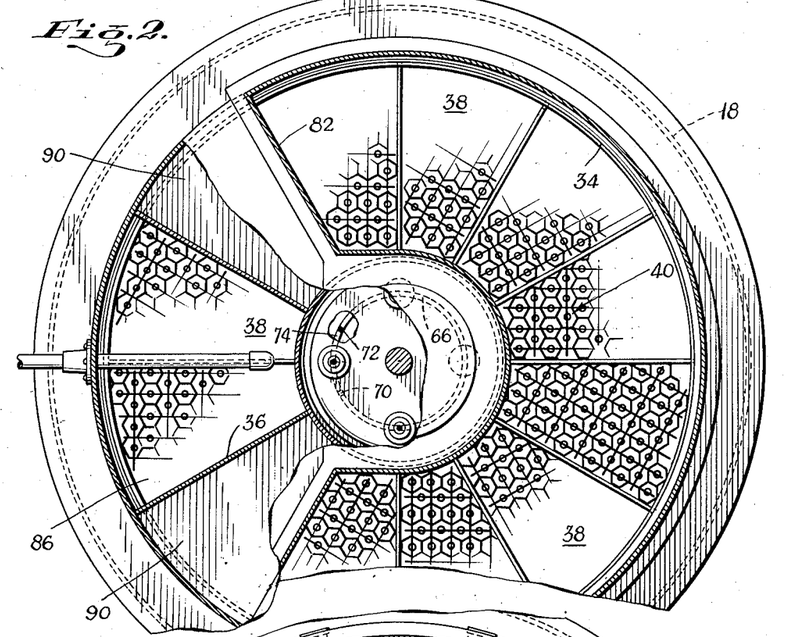
Fig. 2 is a section taken on the line 2—2 of Fig. 1.
Figure 3:
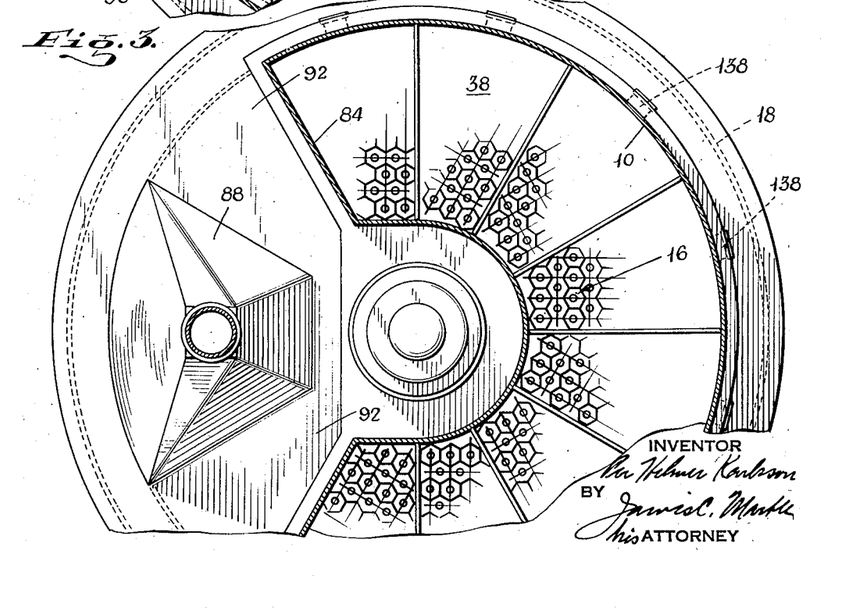
Fig. 3 is a section taken on the line 3—3 of Fig. 1.

While in the embodiment illustrated the stationary mounting structure includes an imperforate shell 18 connecting the end plate structures and enclosing the rotor 28, it will be evident that with effective seals between the rotor and the mounting structures, other specific structural forms may be employed. Thus, as indicated in Fig. 1a, the mounting structure may include instead of the shell 18 a number of peripherally spaced beams or columns 18a joining the end plate portions of the structure. In some instances this latter form of construction may be of advantage because of greater accessibility of the rotor.

Figures 6, 7:
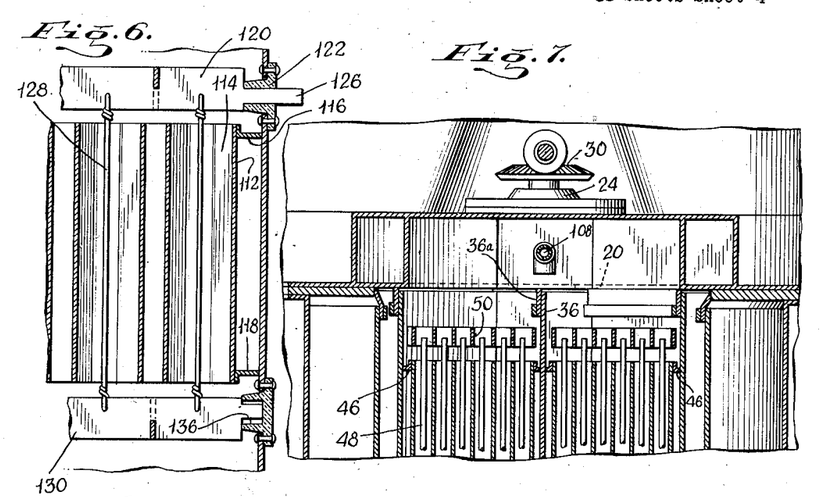
Fig. 6 is a fragmentary longitudinal section illustrating another portion of the apparatus shown in Fig. 1.
Fig. 7 is a fragmentary section taken on the line 7—7 of Fig. 1.

Referring now more particularly to the ionizing section 16, the construction of this section is in many respects similar to the structure as described in connection with the collecting section. As seen more particularly in Figs. 1 and 6 the ionizing section, which is carried by the stationary mounting structure and is coextensive with the opening 84 in the bottom end plate 22, comprises a plate structure 112 providing a plurality of gas channels 114. The marginal spaces between this plate structure and the walls of the duct are closed by upper and lower blocking plates 116 and 118 so that all of the gases are forced to flow through the bank of channels 114. Above the plate structure 112 a grid 120 is provided, this grid being carried by insulating supports 122 and 124. Grid 120 is energized through the feed connection 126. Electrodes 128 secured to grid 120 extend longitudinally and centrally through each of the gas channels which, like the channels in the collecting section, are hexagonal in cross section. These electrodes are relatively of much smaller diameter than the electrodes in the collecting section, and in the embodiment illustrated are in the form of fine wires connected at their lower ends to a grid 130 similar to grid 120 and located below the ionizing section. The weight of grid 130 is carried by the electrode wires and serves to keep them taut. This grid is also insulated from the remainder of the structure by inner and outer insulators 132 and 134, which as will be seen from Fig. 6 are slotted as at 136 to permit the lower grid to move longitudinally with respect to the casing structure in order to compensate for differential expansion between the parts.

While ordinarily the accumulation of solids on the electrodes or the walls of the gas channels in the ionizing section is relatively very slow it is desirable that these surfaces be kept clean, and in the embodiment illustrated the supply channel adjacent to the ionizing section is provided with one or more cleaning ports 138 through which a hand lance may be inserted for applying a cleaning jet of compressed air, steam or the like, which can be used without interrupting the operation of the apparatus.

The operation of the above described apparatus is as follows. From suitable sources which may be of any appropriate known kind, the electrodes of the ionizing and collecting sections of the apparatus are electrically charged, preferably being given a high negative potential. In actual practice negative potentials of the order of 15,000 volts from a direct current source have been found to be satisfactory in operation, although utilization of the apparatus is not limited to this particular kind or value of electrical charge.

With the apparatus thus charged, the impure gases carrying the fines to be collected flow from the supply duct 10 in a multiplicity of streams through the gas channels of the ionizing section in which section the solid particles acquire a negative charge. The gas carrying the charged particles then flows through the multiplicity of gas channels in the collecting section, and in this section, due to the repulsion of the negatively charged particles from the likewise negatively charged electrodes, the particles travel in oblique paths away from the electrodes until they impinge upon and adhere to the plate structure of the collecting section forming the walls of the channels. It has been found that the very fine particles of the order of 15 microns or less will effectively adhere to the collecting surfaces even after having lost their electrostatic charge upon coming in contact with the grounded part of the structure. Larger particles may not adhere to the collecting surfaces and may be carried through the apparatus in the gas stream. However, particles of a size which do not adhere and which may pass through the apparatus are sufficiently large so as to be readily removable from the gas stream by other and well known forms of apparatus of the centrifugal type such as cyclones and the like, it being understood that the primary objective of the present invention is the removal of the extremely fine particles of the kind forming what may be said to be the constituents of smoke, so as to produce substantially clear gases which may or may not carry larger and readily removed particles, depending upon the type of fuel employed, that may be removed by known apparatus either before or after passage of the gases through the apparatus forming the subject of this invention.

As the fines are deposited on the collecting surfaces of the present apparatus, films of solid deposit are built up upon these surfaces, and it has been found that the efficiency of the apparatus falls off relatively rapidly as the thickness of such films or layers of deposits increase. If the apparatus is to operate with a high degree of efficiency from the standpoint of the percentage of fines removed, the collecting surfaces require relatively frequent cleaning, the frequency depending not only upon the nature of the particles, which governs the maximum deposit that can be tolerated, but also upon the percentage or density of content of fines in the gases being cleaned.

In accordance with the present invention this required cleaning may be intermittently or continuously effected without interruption of the continuous cleaning action applied to a continuously flowing column of gases. The portion of the rotor circumferentially coextensive with the gas pass defined by the openings 82 and 84 in the housing structure provides a series of collecting sectors or compartments having gas channels, the total cross sectional area of which is sufficient to provide adequate flow area and collecting area for the quantity of gases being cleaned. This pass represents what may be termed the collecting zone of the apparatus. As will be apparent from the foregoing description of the apparatus, if the rotor is turned the several compartments in the cleaning zone will be moved out of the gas pass and into a position where they lie between the openings 86 and 88 in the end plates, in line with the chamber 102 and receiving hopper 104. The segments located in this position may then readily be cleaned of their accumulated deposits by means of the jet blast which is arranged so that it can be applied to direct the blast through all of the gas channels. The portion of the apparatus in which this function is accomplished may conveniently be referred to as the cleaning zone. Leakage flow of gas or cleaning fluid from the collecting zone into the cleaning zone and vice versa is prevented by the sealing effect obtained between the ends of the radial partitions 36 and the webs 90 and 92 in the upper and lower end plates respectively, these webs having sufficient peripheral extent so that in all positions of the rotor at least one radial partition will be in registry with these webs to provide the desired seal or packing.

When the collecting surface is in the cleaning zone it is desirable that the associated electrodes be de-energized, and it is for this reason that the distributing ring 66 is provided with the insulated dead sector 74 which is located so that the several sector grids are electrically disconnected from the source of current during the time the grids pass through the cleaning zone.

As noted above, highly satisfactory results have been obtained utilizing negative direct current potentials of the order of 15,000 volts. Ordinarily it is desirable to employ somewhat higher voltage for energizing the ionizing section than for energizing the collecting section. More important than this, however, is the nature of the electrodes employed. For the ionizing section the electrodes are preferably of very much smaller diameter than the diameter of the electrodes in the collecting section, and by way of example but without limitation apparatus employing the invention has proved to be very effective when utilizing fine wire electrodes of the order of 0.01 inch in diameter in the ionizing section, while employing rod or tubular electrodes of the order of 0.625 inch in the collecting section. In general, the reason for this may be said to be that for effecting the desired ionizing of the gases and charging of the particles in the ionizing section a highly intense corona effect is desired, which is obtained through the use of a very small diameter electrode. On the other hand, for effecting the deposit of the already charged particles in the collecting zone, all that is necessary is to establish an electrostatic field which will operate to repel the charged particles to the collecting surfaces. For this purpose the large diameter electrodes are advantageous and the desired effect is obtained with relatively very small current input to the collecting section as compared with that to the ionizing section.

The charging of particles in the ionizing section is accomplished very rapidly, in the matter of a fraction of a second, and consequently this section of the apparatus may be relatively short. In the collecting section, the transverse movement of the charged particles toward the collecting surfaces is relatively slower, and for this reason the gas channels in this section are very much longer than is required for the ionizing section.

The exact proportions of the apparatus will, of course, differ with circumstances of gas quantity and velocity and the nature and density of the particles to be removed. By way of example, however, for apparatus of the kind shown in Fig. 1 designed for a gas flow through the apparatus at the rate of approximately 40 feet per second, gas channels in the ionizing section approximately a foot in length are appropriate, with gas channels in the collecting section being of the order of 10-12 feet in length. It will be apparent that the required length of the gas channels in the collecting section is a function of the lateral distance of travel of the charged particles entering the section to the nearest collecting surface, and in a structure as above described operating under the conditions noted, hexagonal gas channels of the kind shown having a cross section inscribed within a 2½ inch circle are appropriate.

The smaller the diameter of the passages the shorter the length can be made, but the reduction in diameter of the passages affects the resistance to flow and consequently the pressure drop of the gases through the apparatus. Consequently, the relation between length and diameter of the passages will be influenced by the amount of pressure drop that can be tolerated as well as the other factors mentioned.

In the embodiment just described the gas channels are of hexagonal section, since obviously this section is most advantageous from the standpoint of securing the maximum available area for gas flow through the collecting section while at the same time providing large collecting surface area. The invention, however, is not limited to the form in which the channels are shaped nor is it limited to the use of single electrodes in each channel.

Figures 8, 9, 10:
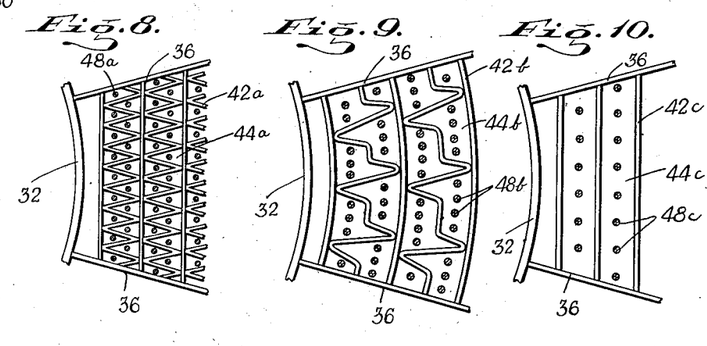
Figs. 8–12 inclusive are fragmentary sections illustrative of different specific embodiments of collecting surface structure usable in apparatus of the kind shown in Fig. 1.
Figures 11, 12:
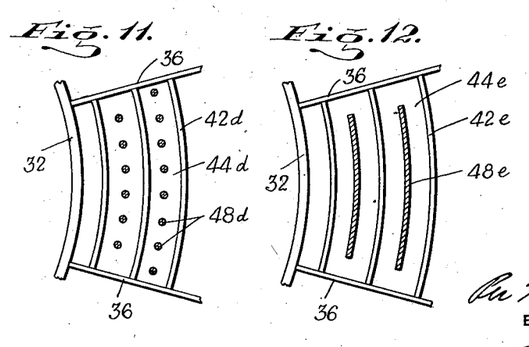

In Figs. 8-12 various modified forms of channel construction are illustrated by way of example. In Fig. 8 the collecting surface 42a is formed by alternating flat and zigzag plates providing channels 44a of triangular section each having centrally located therein an electrode 48a. In Fig. 9 the collecting surface 42b is formed by alternating curved and channeled plates providing channels 44b through each of which a plurality of electrodes 48b extend. In Fig. 10 the collecting surface 42c is formed by a series of spaced parallel flat plates providing elongated channels 44c through which spaced electrodes 48c extend. The structure shown in Fig. 11 is like that shown in Fig. 10 except that the collecting surface 42d is formed by arcuate parallel plates, the channels in this case also being provided with a plurality of electrodes 48d. In the construction illustrated in Fig. 12 the collecting surface provided by the curved plates 42e provides channels 44e energized by plate-like electrodes 48e rather than by electrodes of circular or near circular cross section.

From the above examples it will be evident that the specific design of the gas channels and electrode arrangement may vary widely.

The form which the apparatus as a whole may take also may vary widely within the scope of the invention and in order to illustrate this several specific embodiments having different arrangements of the major component parts of the apparatus will now be described.

Figure 13:
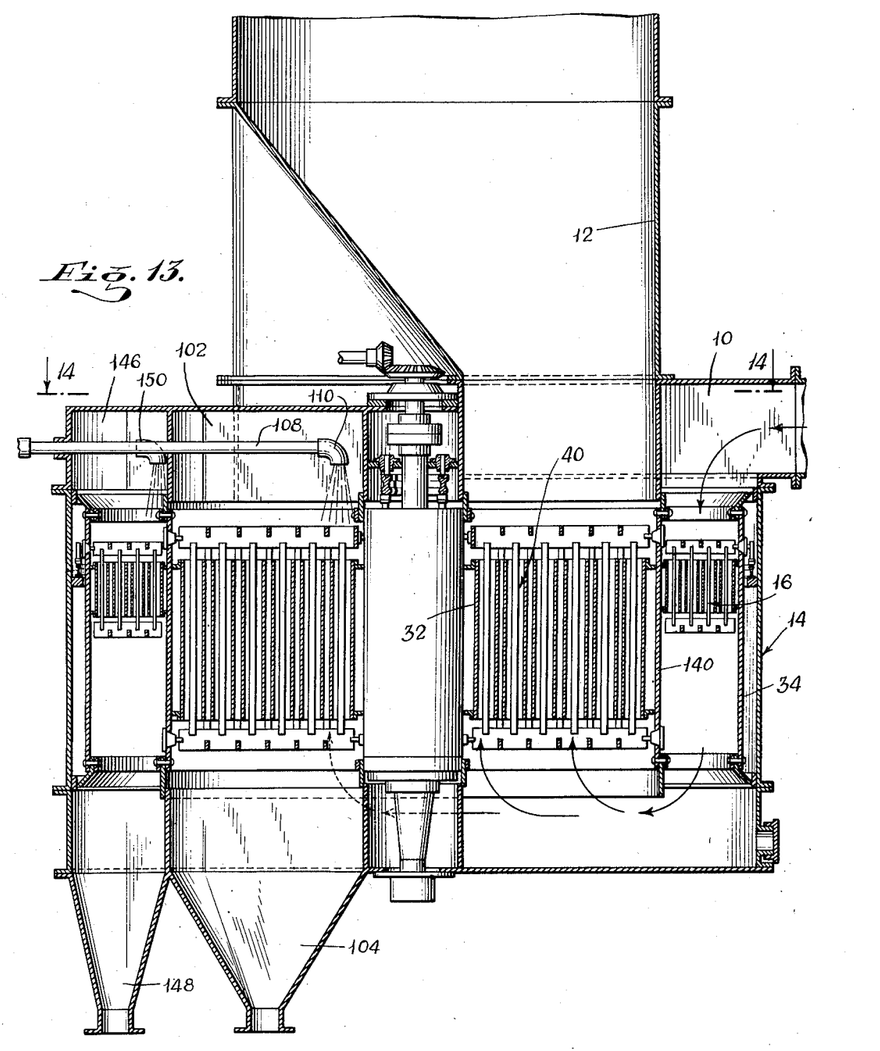
Fig. 13 is a more or less schematic view similar to Fig. 1, details being omitted for the sake of clarity, and showing a different form of apparatus embodying the invention.
Figure 14:
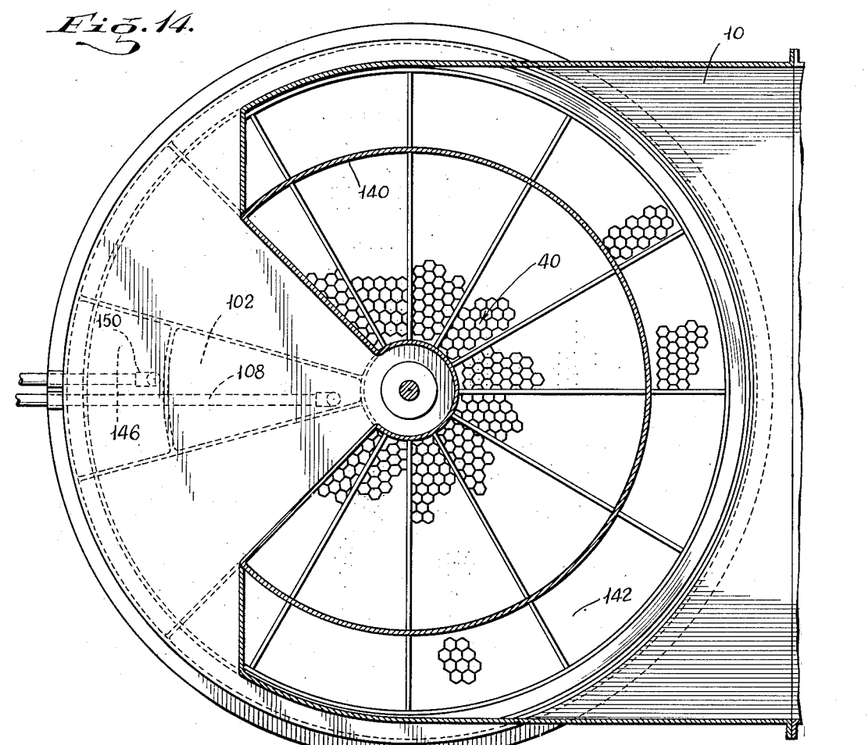
Fig. 14 is a section taken on the line 14—14 of Fig. 13.

In some instances space limitations may make it desirable to provide apparatus of minimum length, and where lateral space conditions are not critical an arrangement such as shown in Figs. 13 and 14 may be employed. In this arrangement the construction of the collecting section 40 is essentially the same as previously described but in this instance the rotor is provided with an intermediate shell 140 between the inner and outer shells 32 and 34 to provide an annular space 142 divided into segments extending around the periphery of the rotor. In this space the ionizing section, indicated generally at 16, is located, details of construction of which are indicated as being the same as in Fig. 1 and which need not be described. With this arrangement, frequent or continuous cleaning of the ionizing section is facilitated, which may be advantageous in the handling of certain types of fines. In this case, since the ionizing section turns with the rotor, a current distributing ring 144 provided with an electrically dead sector (not shown) is provided for energizing and deenergizing the electrodes in the ionizing section.

The stationary structure is formed to provide an inlet to the ionizing section at the top of the rotor, communicating with the inlet duct 10 as seen more clearly from Fig. 14, and the gas flow is first downwardly through the ionizing section in the outer part of the rotor and then upwardly through the collecting section in the central part of the rotor as indicated by the arrow in Fig. 13. The housing structure is formed similarly to that previously described to provide a cleaning zone through which both the collecting and ionizing sections pass. In this instance, in addition to the chamber 102, hopper 104 and cleaning element 108, the cleaning zone provides a chamber 146, hopper 148 and cleaning element 150 for cleaning the ionizing part of the apparatus in the same manner that the collecting section is cleaned.

As previously noted, the collecting section is much longer than the ionizing section, the disparity in length of the two sections not being shown in scale proportion in the drawings, and it will be apparent that if desired additional collecting gas channels may be placed in the lower portion of the outer annulus of the rotor below the ionizing section in order still further to reduce the length of the form of apparatus shown, for a given capacity.

Figure 15:
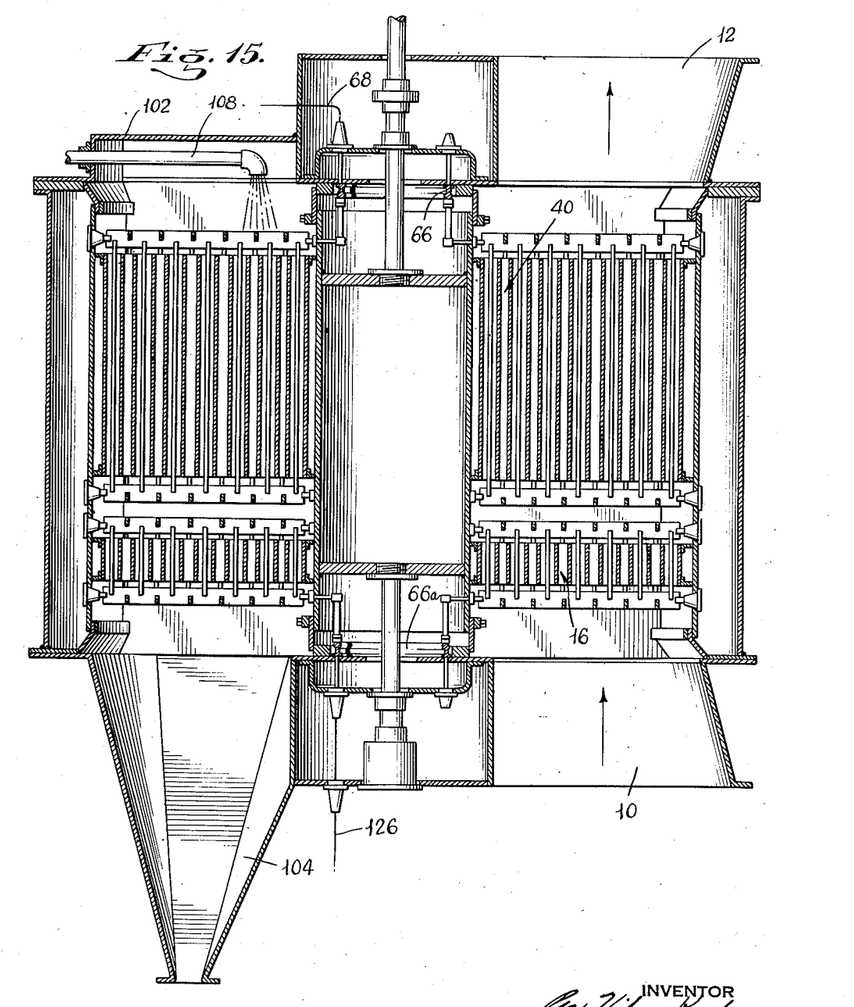
Fig. 15 is a view similar to Fig. 13 showing still another form of apparatus embodying the invention.

Another form of construction in which the ionizing section is carried by the rotor is illustrated in Fig. 15. This arrangement may advantageously be used where space requirements are not limiting as to the height of the apparatus while lateral space may be limited. The general nature of the apparatus will be largely evident from the drawing and the preceding description of the embodiment shown in Fig. 1. In the present instance the construction of the collecting section 40 which is located in the upper part of the rotor is essentially as previously described, the ionizing section 16 being carried in the lower portion of the rotor and being energized through the feeder 126 through a distributing ring 66a similar to the distributing ring 66 which energizes the collecting section. The arrangement of the stationary structure to provide a gas passage and a cleaning zone through which the rotor elements pass is as previously described and need not again be described in detail for an understanding of the operation of this form of the apparatus, which differs from the form shown in Fig. 1 essentially in the fact that the ionizing and collecting sections are cleaned in the same cleaning zone substantially simultaneously by the same cleaning apparatus.

Figure 16:
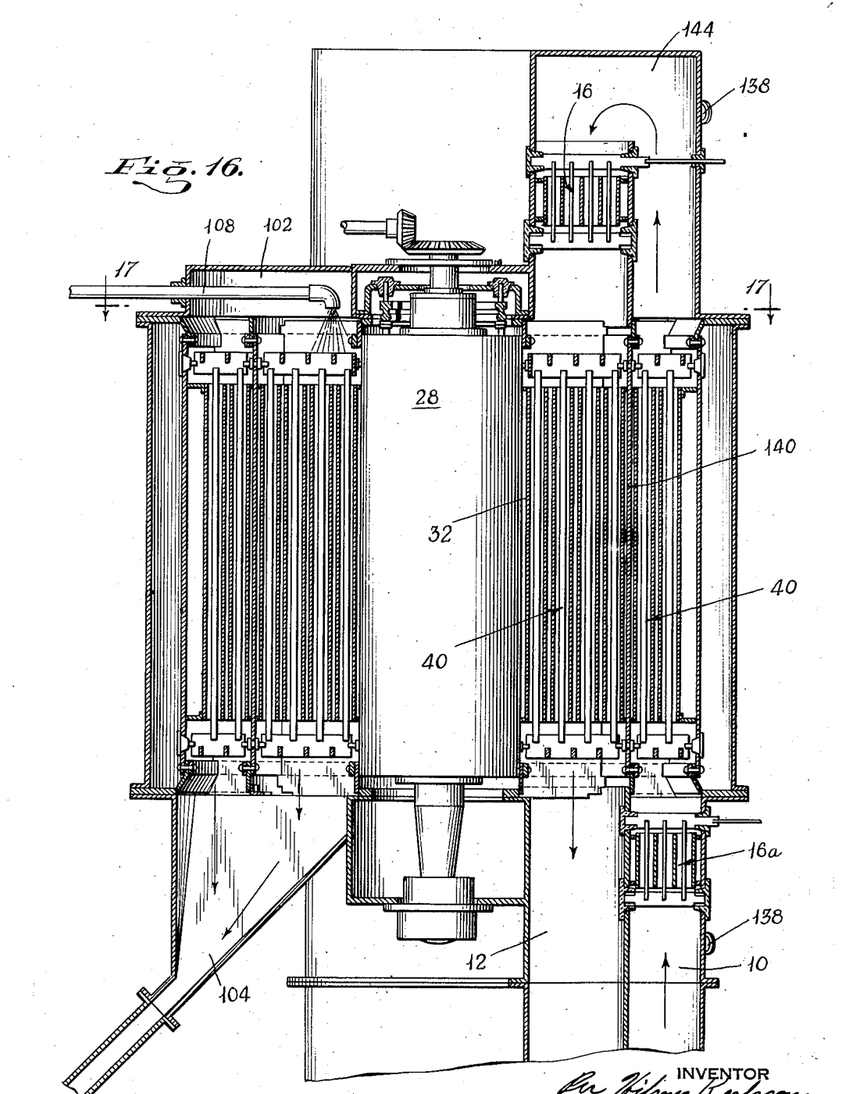
Fig. 16 is a view similar to Figs. 13 and 15 showing still another form of apparatus embodying the invention.
Figure 17:
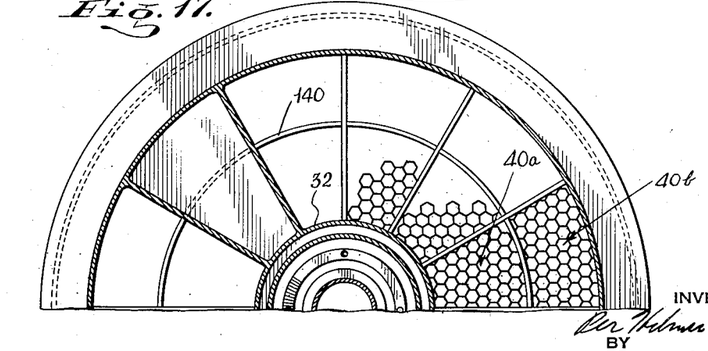
Fig. 17 is a section taken on the line 17—17 of Fig. 16.

In Figs. 16 and 17 a two pass embodiment is shown employing two ionizing sections and two collecting sections arranged for series flow of the gases through these sections. In this form the rotor 28 is provided with an intermediate shell 140 as in the form shown in Fig. 13, to divide the rotor into inner and outer sections. In this case, however, collecting sections 40a and 40b, the construction of which is as heretofore described, are mounted in the two parts of the rotor, being separated by the intermediate shell 140.

Two stationary ionizing sections 16a and 16b are provided in the stationary structure, the former being mounted below the rotor and communicating with the inlet duct 10, while the latter is mounted in a suitable chamber 144 which operates to reverse the direction of flow of the gases as indicated by the arrows in Fig. 15 and direct the gases downwardly through the second ionizing section and the inner collecting section 40a to the outlet duct 12.

As in the previously described embodiments, a cleaning section is provided, a single chamber 102 at the top and hopper 104 at the bottom sufficing for collection of material removed from both the inner and outer collecting sections.

As in the embodiment shown in Fig. 1, the ionizing section may be cleaned by lances inserted through the ports 138. In this form of the apparatus advantages may be obtained under certain circumstances with respect to cleaning since owing to the series arrangement of the component parts, one or the other of the stationary ionizing sections may be electrically deenergized during cleaning without materially affecting the efficiency of the apparatus due to the fact that the ionizing section not being cleaned, and its associated cleaning section, are in operation. Also, the construction provides means for handling gases having high degrees of smoke concentration, without resorting to use of a structure of undue length.

Figure 18:
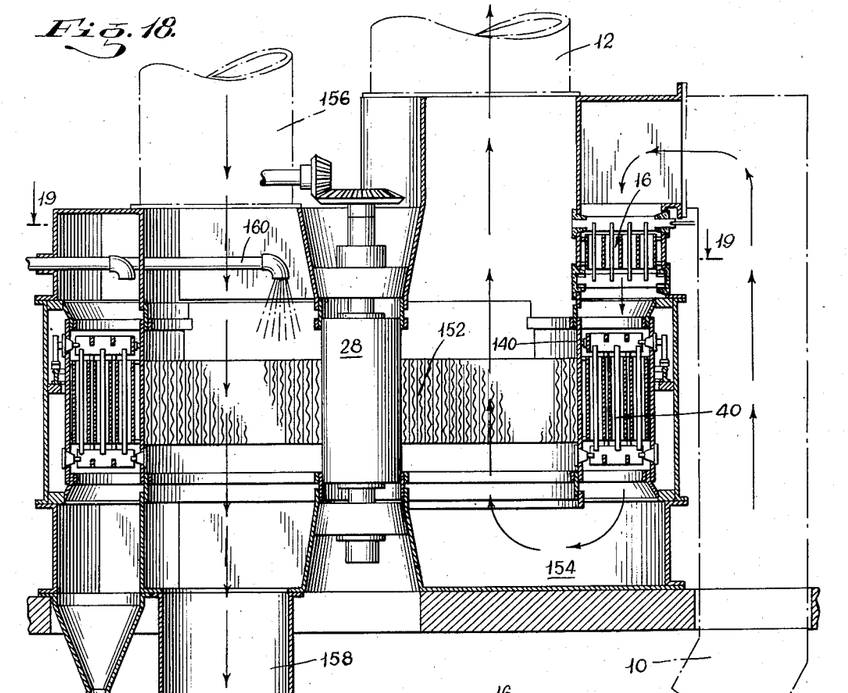
Fig. 18 is a view similar to Figs. 13, 15 and 16 showing a form of apparatus embodying the invention and in which gas cleaning and heating exchange elements are combined in a unitary structure.

As previously noted, the fines which it is the primary object of the invention to remove has been found to have a highly corrosive effect if permitted to accumulate on heat exchange surfaces, and in one of its aspects the present invention provides for combining the cleaning apparatus with heat exchange structure to clean the gases just prior to their contact with the surface of such a structure. This combination is of particular utility in connection with regenerative air preheaters of the well known Ljungstrom type, and in Figs. 18 and 19 there is shown a suitable construction for this application of the invention. Referring now to these figures, the rotor 28 is provided with an intermediate wall 140. In the sectors or compartments inside this wall, heat exchange elements indicated at 152 and providing a multiplicity of passages through the rotor are provided. The specific nature of this heat exchange surface is not germane to the present invention, and since in its various forms it is well known in the art need not be described herein in detail. It may advantageously be of the kind disclosed in Lysholm U. S. Patent No. 2,023,965, granted December 10, 1935. The collecting section 40 of the cleaning apparatus is mounted in the outer portion of the rotor and the ionizing section 16 is mounted in the stationary housing structure, the construction being in general similar to the arrangement of the ionizing and collecting sections 16a and 40a respectively in the embodiment shown in Fig. 16. In the present arrangement the impure gas flows first through the stationary ionizer from the duct 10 downwardly through the ionizing section and the collecting section in the outer part of the rotor. The direction of flow of the cleaned gas is then reversed in chamber 154 below the rotor, and the gas flows upwardly past the heat exchange surface 146 to the outlet duct 12.

Air or gas to be heated is delivered from duct 156 and flows through the passages provided between the heat exchange elements to the outlet duct 158.

Figure 19:
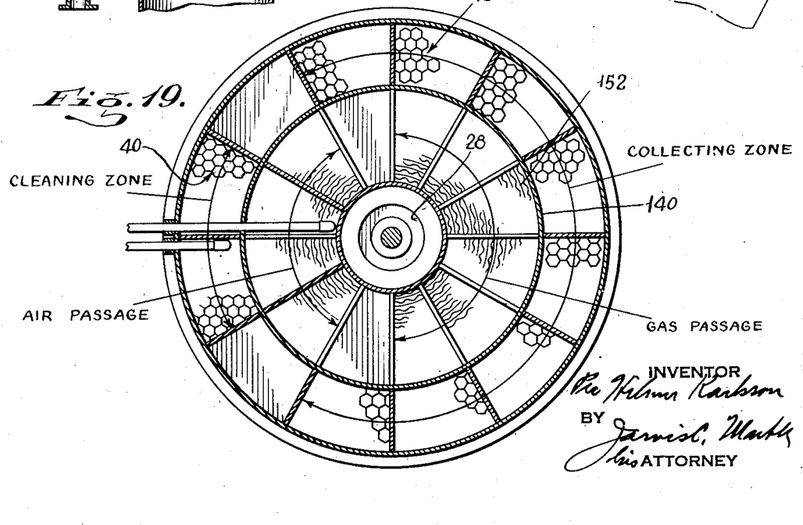
Fig. 19 is a section taken on the line 19—19 of Fig. 18.

The end plates of the stationary structure in this construction are formed so that the peripheral extent of the gas passage through the rotor for heating the cleaned gases is as indicated in Fig. 19, while the passage for flow of air to be heated has the extent also indicated in this figure. The space between these two passages is blocked off by the radially extending webs of the housing end plates to provide the necessary seal for preventing cross flow between the air and gas passages. Advantageously, the outer portions of the end plates of the structure may be formed with the outer portions of the radially extending webs offset from the radially inner portion of these webs so as to provide collecting and cleaning zones in the outer part of the rotor having peripheral extents as indicated by the arrows in Fig. 19. This arrangement provides for maximum area of collecting zone while leaving sufficient space for an adequate cleaning zone.

For efficient heat exchange by the above described apparatus it is, of course, necessary that the heat exchange elements 152 be kept free from accumulations of solid deposits, and as a precautionary measure in the event of failure for any reason of the gas cleaning part of the apparatus due to power failure or the like, provision is advantageously made for cleaning the heat exchange elements by means of a cleaning blast pipe 160 located above the rotor in the air passage, which may be utilized also as a cleaning zone for the heat exchange portion of the apparatus, since the slight accumulations that may from time to time be removed from the heat exchange elements can be carried without ill effect into the combustion chamber or like to which the preheated air is fed.

In all of the previously described embodiments the collecting section of the cleaning apparatus is rotatably mounted for movement across the gas column and a cleaning zone. This arrangement, while advantageous in many instances, is not essential to carry out the broad principles of the invention since if desired the collecting section of the apparatus may be stationary with suitable provision being made for changing the relative flow of gases with respect to the collecting section to isolate portions thereof from the gas flow, so that cleaning of the isolated portions may be accomplished without interrupting the continuity of removal of the impurities from a continuously flowing gas column in other portions of the collecting section.

Figure 20:
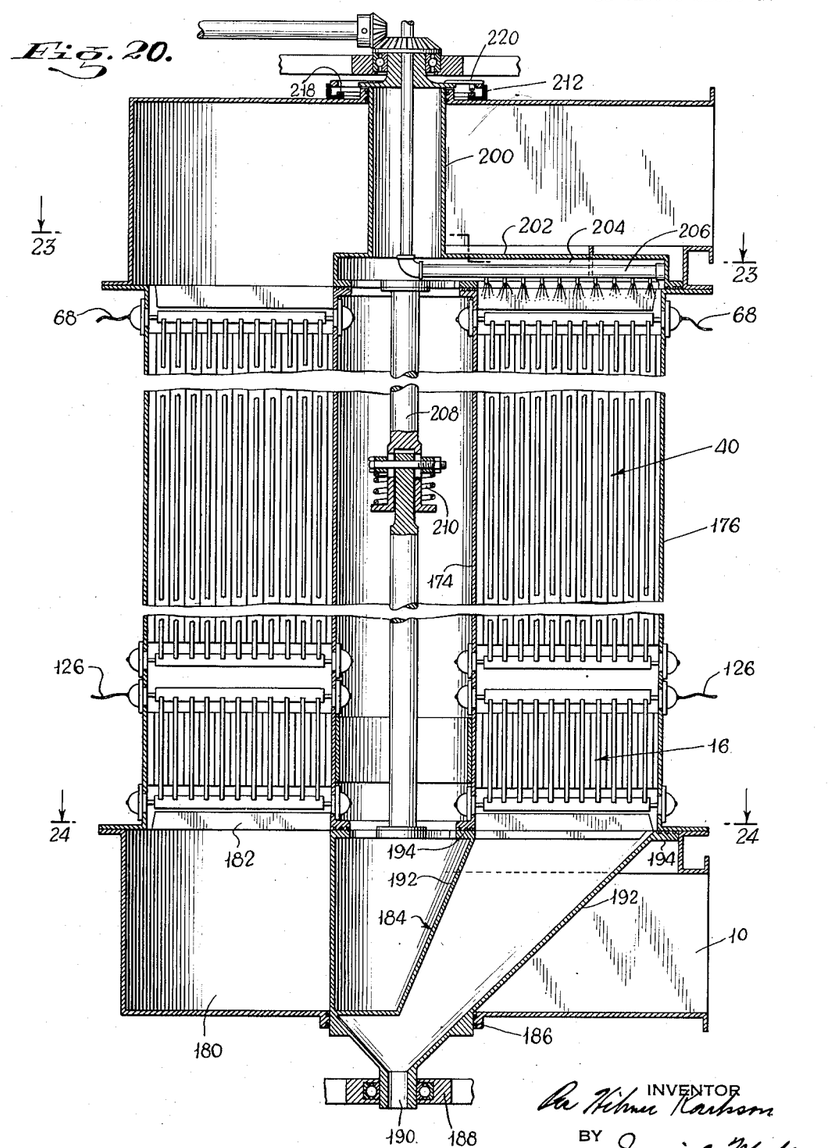
Fig. 20 is a more or less schematic longitudinal central section showing another form of apparatus embodying the invention.
Figure 21:
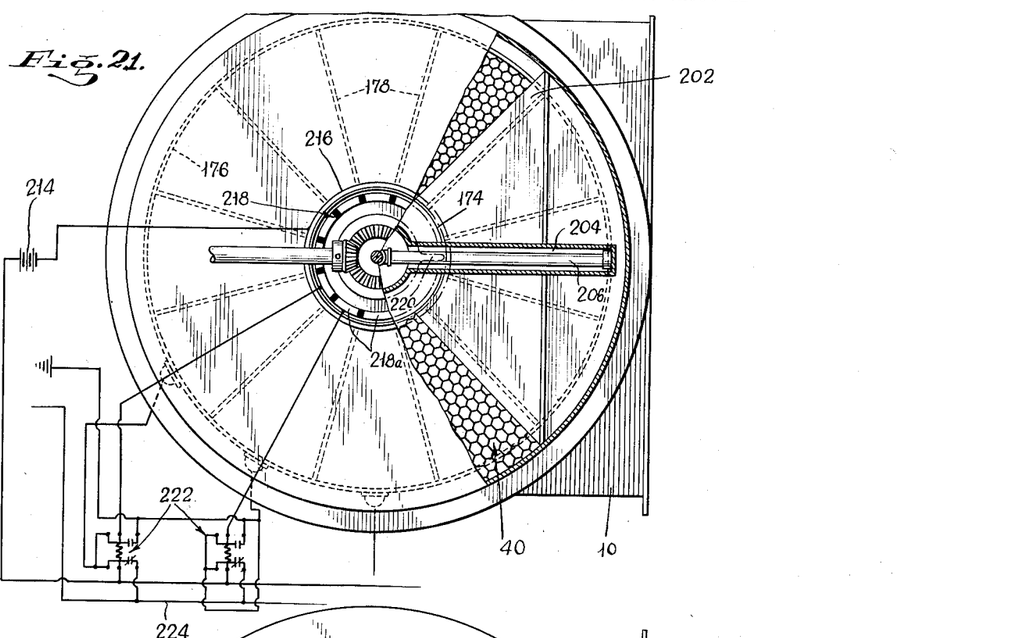
Fig. 21 is a section taken on the line 23—23 of Fig. 22.
Figure 22:
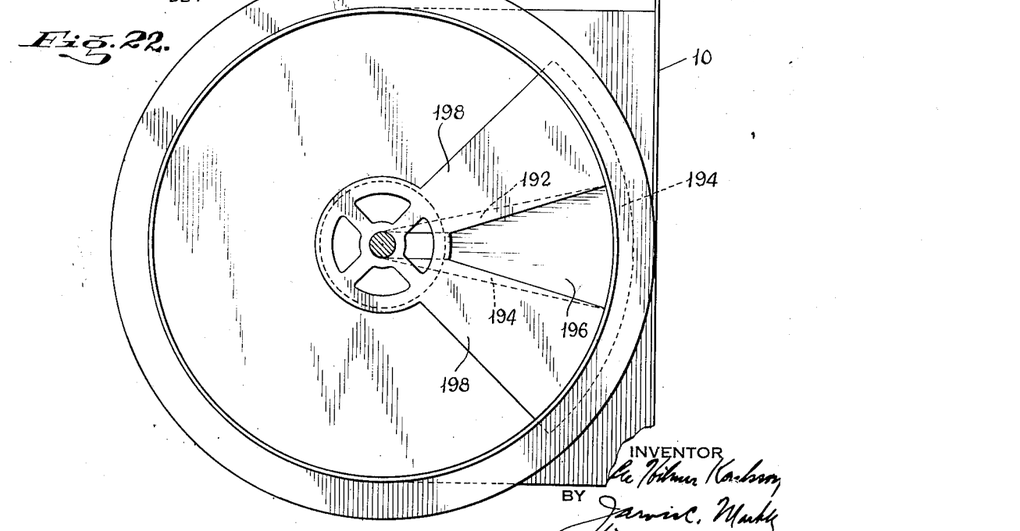
Fig. 22 is a section taken on line 24—24 of Fig. 20.

A form of apparatus embodying the invention and utilizing stationary collecting surface is shown in Figs. 20 to 22 inclusive. In this apparatus the stationary housing structure comprises spaced inner and outer cylindrical shells 174 and 176 joined by radially extending partitions 178 providing an annular space divided into sector-like compartments similar to the compartments in the rotors of previously described embodiments. In the upper portions of the compartments the collecting section 40 of the apparatus is located, the construction of this section being essentially the same as that previously described, providing banks of gas channels traversed by insulated electrodes energized through the feeder connections 68 distributed around the upper part of the periphery of the outer shell. In the lower portion of the space between the shells the ionizing section 16 is located, the construction of which is similar to that previously described, the radial partitions 178 being coextensive in length with the shells of the casing structure so that the ionizing section as well as the collecting section is divided and located in a series of compartments, the several parts of the ionizing section being energized through the feed connections 126.

The casing structure is formed to provide a chamber 180 having gas inlet 10 and communicating through the annular opening 182 with the annular space in which the ionizing and collecting sections are located. Within this chamber there is located a rotatably mounted hopper 184 projecting at its lower end through a suitably sealed opening 186 in the casing structure, being carried by a suitable bearing 188 and having an external discharge outlet 190.

As will be seen from Figs. 20 and 22 the hopper 184 comprises walls 192, extending through chamber 180, and an upper closure plate 194 located to bear against the flanged ends of the inner and outer housing shells as the hopper is rotated. Plate 194 is provided with a sector-like opening or port 196 flanked on either side by sector-shaped webs or wings 198, the angular extent of the port and webs being substantially coextensive with the angular extent of the compartments between the partitions 178 in he housing structure.

As will be evident from the drawings the webs 198 of the hopper function in much the same manner as the radially extending webs in the end plates of the housing structure in the forms of apparatus employing rotors, forming in effect seals between the compartment with which the port 196 is in registry and the compartments through which gas is flowing. It will further be evident as the hopper is rotated the port 196 will be successively brought into registry with different ones of the compartments.

At the upper end of the shell structure a rotatably mounted casing 200 is provided, which as will be seen more clearly from Fig. 23, comprises a sector-shaped wing 202 providing a chamber 204 housing a cleaning element 206 rotatable with the casing 200 by means of the gearing 30. The casing 200 operates to isolate a compartment to be cleaned from the compartments through which gas is flowing in the same manner as the hopper effects this separation at the lower end of the apparatus, and it will be evident that as the hopper and casing are rotated different compartments can be successively cleaned without interruption to the flow through the apparatus of the gas to be cleaned.

For synchronized operation the casing 200 and hopper 184 are connected by means of a driving connection 208 provided with a spring-loaded slip joint 210 to compensate for differential expansion between the parts.

In this form of the apparatus as well as in those previously described, it is desirable to de-energize any section of the apparatus from which deposits are being cleaned, and in the present embodiment this is provided for by a rotary switch indicated diagrammatically at 212. Owing to the high potential supplied to the electrodes of the apparatus, it is desirable that this switch control low voltage circuits the interruptions to which are transmitted to the high voltage feeders of the several compartments through suitable relays. Switching apparatus of this character is well known in the art and may be carried out in many different forms, but by way of illustration one suitable arrangement is diagrammatically shown in Fig. 21. A low potential current source 214 is connected to the stationary switching ring 216 insulated from the housing and spaced from a second switching ring 218 consisting of a number of segments or contacts 218a insulated from each other and corresponding in number with the number of compartments in the housing. A contact arm 220 is carried by the rotating casing 200 connecting the switching ring 216 with successive ring segments 218a as the casing 220 is turned. Each segment 218a is connected to one terminal of the actuating element of a different relay 222, the other terminal of which is connected to the source 214 so that a circuit is closed through successive relays by the contact arm 220. Relays 222 are of the high voltage type and control the high tension current supplied to the respective feeder connections 68 and 128 from the high tension source 224, the arrangement being such that each relay controls the current supply to the connections 68 and 128 for the same compartment. Further the relays are of the type in which the high tension circuit is broken when the low potential actuating element is energized. The mode of operation will be largely obvious from the foregoing, the contact arm 220 moving together with the cleaning element to successively energize the low potential circuits and thereby cause the compartments with which the cleaning element is in registry to be de-energized.

While it is evident from the different forms of construction above described that a wide variety of structures may be employed, certain characteristic features of the invention are common to the various dfferent types of apparatus. It is characteristic of the invention that the gas column to be cleaned is split up into a number of separate streams flowing in parallel through energized channels in which the fines after being charged are removed by passing through the electrostatic fields of the individually charged channels. It is further characteristic of the apparatus that the total cross sectional area of the gas channels provided by the collecting section of the apparatus is greater than that required for flow of the gas column through the apparatus without exceeding the permissible pressure drop, so that there is always one or more groups or banks of channels not at any given time required for the collection of impurities taken from the gases, and available to be isolated from the gas flow for cleaning without interruption to the continuous gas cleaning function of the apparatus as a whole.

From the foregoing description of the several different embodiments herein disclosed it will be apparent that the invention may be employed in widely differing forms of apparatus. It will also be apparent that the invention is applicable for cleaning to many different specific compositions of gases with widely varying contents of fines, which depending upon their density will make different cycles of cleaning desirable. Further it will be evident that the invention provides for automatic cleaning in accordance with a predetermined intermittent time cycle or by continuous relative movement between the controlling parts, through selected operation of the actuating parts, and that in conjunction with such cleaning, automatic de-energization of the parts undergoing cleaning may be accomplished. It is accordingly to be understood that the invention is not limited in its scope to the specific structures and operations thereof herein disclosed, but it is to be considered as embracing all forms of apparatus and modes of operation falling within the scope of the appended claims.

What is claimed is:

1. In gas cleaning apparatus, a rotor comprising a framework providing a series of circularly arranged sector-like compartments, a plate structure carried by said framework and providing a bank of axially extending open ended channels in each of said compartments, electrically insulated means carried by said framework and including electrodes extending through said channels in spaced relation to the walls thereof for electrostatically charging said channels and a separate connection for energizing the electrodes of each bank; relatively rotatable means operative as the rotor turns for periodically isolating predetermined ones of said compartments from said supply and discharge channels as the rotor turns while permitting continued gas flow through the remaining compartments, means for supplying current to said electrodes including rotatable control elements moving with said compartment isolating means for simultaneously electrically isolating the electrodes of any compartment isolated from said supply and discharge channels while maintaining the electrodes of the remaining compartments electrically energized, cleaning means comprising conduits for discharging cleaning fluid under pressure through the gas passages of isolated compartments in said rotor, and means providing a separate discharge channel communicating only with compartments isolated from the gas flow for conducting from the apparatus precipitated material dislodged by said cleaning fluid.

2. A rotor as set forth in claim 1, in which each compartment is provided with at least two separate plate structures each providing a bank of gas channels, said gas channels being arranged for series flow of gas through the different banks and each bank being provided with separate electrically insulated electrode means for energizing the channels of the bank.

3. A rotor as set forth in claim 2, in which the channels of the bank first traversed by the gases are very much shorter than the channels of a succeeding bank.

4. A rotor as set forth in claim 1, in which an intermediate circumferential partition divides said compartments into groups of radially inner and radially outer compartments and in which separately energized banks of gas channels are provided in the radially inner and radially outer compartments.

5. A rotor as set forth in claim 1, in which a circumferentially continuous partition divides said compartments into groups of radially inner and radially outer compartments and in which separates banks of gas channels are provided in the different compartments, and said electrically insulated means is arranged so that the several banks are energized in separate pairs each consisting of a radially inner bank and its radially adjacent outer bank.

6. Apparatus as set forth in claim 1, in which partitioning means carried by the rotor divides said channels into groups of radially inner and radially outer groups and said stationary structure is arranged to cause the gases to be cleaned to flow serially through the radially different groups.

7. Gas cleaning apparatus comprising a stationary structure providing a path for flow of gas from an inlet to an outlet and a cleaning zone, a rotor mounted to traverse said path and said cleaning zone, means carried by said rotor providing a collecting section comprising a multiplicity of electrostatically charged channels extending through said rotor, said rotor and said stationary structure being arranged for flow of gases through said channels in serially connected passes, and ionizing means carried by said stationary structure, said ionizing means comprising electrically energized channels for flow of gas therethrough and said ionizing means being divided into different parts, there being one part located in advance of each of said passes through the rotor, means for turning the rotor to move the channels in the rotor alternately through the gas path and the cleaning zone and means for blowing deposits from the walls of said channels during their passage through the cleaning zone.

8. Gas cleaning apparatus comprising a stationary structure providing a path for flow of gases to be cleaned and a cleaning zone, a rotor mounted to traverse said path and said cleaning zone, said rotor being divided into radially inner and radially outer parts each providing a pass for flow of gas through the rotor, an ionizing section comprising a multiplicity of electrically energized passages located in one of the passes of the rotor, a collecting section comprising a multiplicity of electrostatically charged gas channels in the other pass of the rotor, means for turning the rotor to move said channels through the cleaning zone and means for separately blowing the deposits from the walls of the channels of the ionizing section and the collecting section as the channels move through the cleaning zone.

9. Apparatus of the character described comprising a stationary structure providing a path for flow of hot impure gas from an inlet to an outlet and a separate path for air to be heated from an inlet to an outlet, a rotor mounted to traverse said paths, said rotor being divided into different parts, regenerative heat exchange material carried by the rotor in one of said parts and gas cleaning means comprising a multiplicity of electrostatically charged channels carried by said rotor in another part, said stationary structure and rotor being arranged for flow of gases through said channels prior to its flow through said regenerative material.

10. Apparatus as set forth in claim 9, in which said stationary structure provides a cleaning zone through which said channels pass as the rotor is turned relative to said stationary structure.

11. Apparatus as set forth in claim 9, in which said gas cleaning apparatus includes an electrically energized ionizing section carried by said stationary structure and located in the gas path in advance of the channels carried by said rotor.

12. Gas cleaning apparatus comprising means providing supply and discharge channels for flow of gas to be cleaned, a gas ionizing section and a separate collecting section in communication with said channels and arranged for flow of gas serially through said sections in the order named, each of said sections comprising a plurality of sector-shaped compartments arranged symmetrically about a common axis, each of said compartments containing plate structure for sub-dividing the compartments into a plurality of flow passages for the gas, a plurality of electrically separate groups of electrodes, one for each compartment, mounted in fixed spaced relation to the plate structure of the compartment and extending lengthwise of said gas passages, relatively rotatable means including structure rotatable about said axis for completely isolating predetermined ones of said compartments from said supply and discharge channels while permitting gas flow through the remaining compartments, means for supplying current to said electrodes including rotatable control elements moving with said rotatable structure for electrically isolating the electrodes of any compartment isolated from said supply and discharge channels while maintaining the electrodes of the remaining compartments electrically energized, cleaning means comprising conduits for discharging cleaning fluid under pressure through the gas passages of isolated compartments, and means providing a separate discharge channel communicating only with compartments isolated from the gas flow for conducting from the apparatus precipitated material dislodged by said cleaning fluid.

13. Gas cleaning apparatus comprising means providing supply and discharge channels for flow of gas to be cleaned, a gas ionizing section and a separate collecting section in communication with said channels and arranged for flow of gas serially through said sections in the order named, each of said sections being divided by radially extending partitions into a plurality of sector-shaped compartments arranged symmetrically about a common axis, each of said compartments containing plate structure for sub-dividing the compartment into a plurality of flow passages for the gas, a plurality of electrically separate groups of electrodes, one for each compartment, mounted in fixed spaced relation to the plate structure of the compartment and extending lengthwise of said gas passages, relatively rotatable means including structure rotatable about said axis for isolating predetermined ones of said compartments in both sections from said supply and discharge channels while permitting gas flow through the remaining compartments, means for supplying current to said electrodes including rotatable control elements moving with said rotatable structure for electrically isolating the electrodes of any compartment isolated from said supply and discharge channels while maintaining the electrodes of the remaining compartments electrically energized, cleaning means comprising conduits for discharging cleaning fluid under pressure through the gas passages of isolated compartments, and means providing a separate discharge channel communicating only with compartments isolated from the gas flow for conducting from the apparatus precipitated material dislodged by said cleaning fluid.

14. Gas cleaning apparatus comprising means providing supply and discharge channels for flow of gas to be cleaned, a gas ionizing section and a separate collecting section in communication with said channels and arranged for flow of gas serially through said sections in the order named, each of said sections comprising a plurality of sector-shaped compartments arranged symmetrically about a common axis and with the compartments of the two sections axially alined, each of said compartments containing plate structure for sub-dividing the compartment into a plurality of flow passages for the gas, a plurality of electrically separate groups of electrodes, one for each compartment, mounted in fixed spaced relation to the plate structure of the compartment and extending lengthwise of said gas passages, relatively rotatable means including structure rotatable about said axis for isolating predetermined ones of said compartments from said supply and discharge channels while permitting gas flow through the remaining compartments, means for supplying current to said electrodes including rotatable control elements moving with said rotatable structure for electrically isolating the electrodes of any compartment isolated from said supply and discharge channels while maintaining the electrodes of the remaining compartments electrically energized, cleaning means comprising conduits for discharging cleaning fluid under pressure through the gas passages of isolated compartments, and means providing a separate discharge channel communicating only with compartments isolated from the gas flow for conducting from the apparatus precipitated material dislodged by said cleaning fluid.

15. Apparatus as set forth in claim 14, in which the rotatable means includes a cleaning element located at one end of said compartments for supplying a blast of cleaning fluid to an isolated compartment and a hopper located at the other end of said compartments and having an outlet communicating with the exterior of said ionizing and collecting sections for discharging deposits removed by said cleaning fluid, said cleaning element and said hopper being movable together and located to register at the same time with the opposite ends of the same compartment.

16. Gas cleaning apparatus comprising means providing supply and discharge channels for flow of gas to be cleaned, a cylindrical gas ionizing rotor and a separate collecting rotor mounted with their axes alined and communicating with said channels at one side of the rotor axes and arranged for flow of gas serially through said rotors in the order named, each of said rotors being divided by radial partitions into a plurality of sector-shaped compartments arranged symmetrically about the rotor axis and with the compartments of the two sections alined, each of said compartments containing plates paralleling the rotor axis for sub-dividing the compartment into a plurality of flow passages for the gas, a plurality of electrically separate groups of electrodes, one group for each compartment, mounted in fixed spaced relation to the plates of the compartment and extending lengthwise of said gas passages and axially of the rotor, relatively rotatable means operative as the rotor turns about said axis for periodically isolating predetermined ones of said compartments in both rotors from said supply and discharge channels as the rotors turn while permitting continued gas flow through the remaining compartments, means for supplying current to said electrodes including rotatable control elements moving with said compartment isolating means for simultaneously electrically isolating the electrodes of any compartment isolated from said supply and discharge channels while maintaining the electrodes of the remaining compartments electrically energized, cleaning means comprising conduits for discharging cleaning fluid under pressure through the gas passages of isolated compartments in both rotors, and means providing a separate discharge channel communicating only with compartments isolated from the gas flow for conducting from the apparatus precipitated material dislodged by said cleaning fluid.

PER HILMER KARLSSON.

REFERENCES CITED

The following references are of record in the file of this patent:

UNITED STATES PATENTS

| Number | Name | Date |
|---|---|---|
| 2,333,551 | Pegg | Nov. 2, 1943 |
| 2,351,089 | Abbey | June 13, 1944 |
| 2,409,563 | Hedberg | Oct. 15, 1946 |
| 2,422,564 | Pegg | June 17, 1947 |
| 2,443,780 | Wintermute | June 22, 1948 |

FOREIGN PATENTS

| Number | Country | Date |
|---|---|---|
| 428,471 | Great Britain | May 14, 1935 |
| 469,823 | Great Britain | June 21, 1937 |
| 713,691 | France | Oct. 31, 1931 |
| 339,625 | Germany | July 29, 1921 |
| 545,523 | Germany | Mar. 2, 1932 |
| 656,258 | Germany | Feb. 26, 1938 |